No. 862,473. PATENTED AUG. 6, 1907.
G. E. HARPER.
STALK CUTTER.
APPLICATION FILED MAR. 5, 1907.
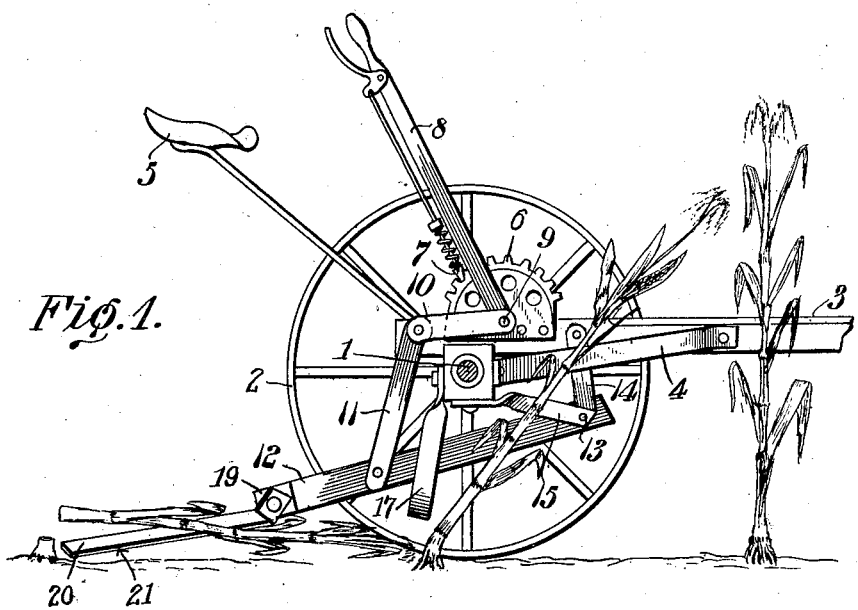
Fig. 1.
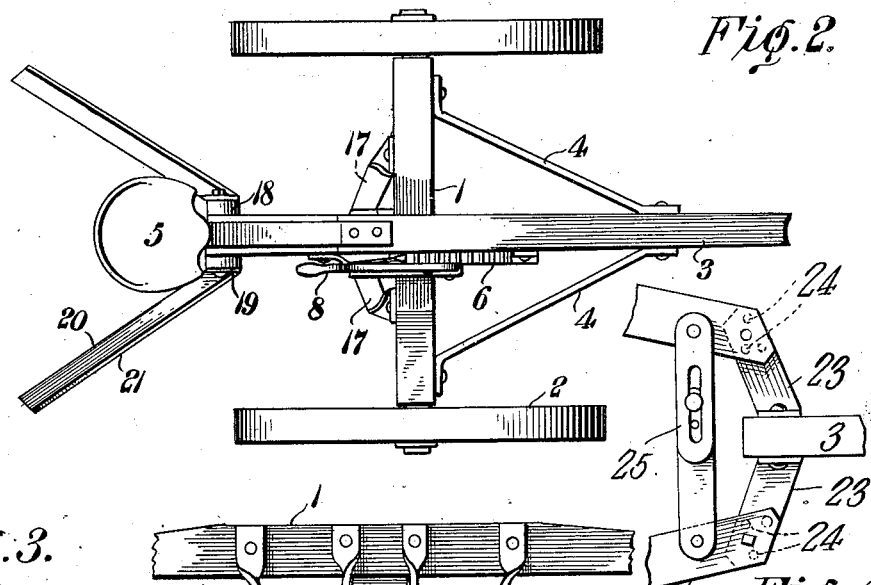
Fig. 2.
Fig. 3.
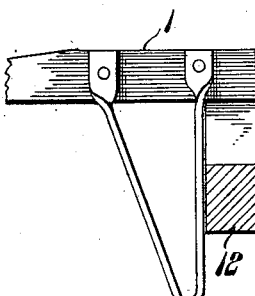
Fig. 4.
WITNESSES:
George E. Harper,
INVENTOR
By C. A. Snow & Co.
ATTORNEYS.

UNITED STATES PATENT OFFICE.

GEORGE EDWARD HARPER, OF MYRA, TEXAS.

STALK-CUTTER.

No. 862,473.  Specification of Letters Patent.  Patented Aug. 6, 1907.

Application filed March 5, 1907. Serial No. 360,802.

*To all whom it may concern:*

Be it known that I, GEORGE EDWARD HARPER, a citizen of the United States, residing at Myra, in the county of Cooke and State of Texas, have invented a new and useful Stalk-Cutter, of which the following is a specification.

This invention relates to stalk cutters and its object is to provide a device of this character which is of simple and durable construction, which can be readily manipulated, and which will operate to cut stalks simultaneously along two rows.

A still further object is to provide a simple arrangement of cutting blades whereby the stalks can be quickly cut in an efficient manner and will be caused to assume positions above the blades where they will not interfere with the further cutting operation.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of the machine in use, one of the supporting wheels thereof being removed; Fig. 2 is a plan view of the machine; Fig. 3 is an enlarged view showing the axle and the guides in elevation and the adjustable bar in section; and Fig. 4 is a detail view showing a modified means for adjusting the blade.

Referring to the figures by characters of reference, 1 is an axle supported by wheels 2 and carrying a tongue 3 which is connected to the axle by means of suitable braces 4. A driver's seat 5 is suitably supported above the tongue and disposed adjacent thereto is a toothed sector 6 designed to be engaged by a spring pressed plunger 7 connected to an actuating lever 8. This lever is fulcrumed at its lower end, as shown at 9, and has an arm 10 extending rearwardly therefrom. Pivotally connected to this arm is a link 11 which is also pivoted to a bar 12. The forward end of this bar is fulcrumed as shown at 13 between brackets 14 which are secured to and suspended from opposite faces of the tongue 3 and are also suitably braced by means of arms 15 which are fastened to the axle 1. The bar 12 is mounted to swing vertically between hangers 16 which are fastened to and are suspended from the axle to constitute guides. Each of these hangers is preferably formed with an integral brace 17 which is also connected to the axle.

Secured to the opposite faces of the rear portion of the bar 12 are spacing blocks 18 to the outer faces of which are detachably secured plates 19. Extending rearwardly and laterally from these plates are obliquely disposed blades 20, the forward edges 21 of which are sharpened. These blades are so proportioned as to extend across two rows of stalks and by manipulating the lever 8 the bar 12 can be swung upon its fulcrum 13 so as to raise or lower the blades.

In using the machine herein described the same is driven along two rows of stalks, each row being received between the tongue 3 and one of the wheels 2. As the machine moves forward the stalks are successively bent forward by the axle 1 and the braces 4 connected thereto and the blades 20 contact with the stalks where the bends are produced. As these blades are obliquely disposed they will produce a shearing action and will quickly cut through the stalks which, as soon as severed, will spring upward and fall upon the blades so that the blades will pass longitudinally thereunder against the next stalks and without being interfered with by the stalks which have been cut. Considerable importance is attached to the provision of means for first bending the stalks and then cutting them where the bend is greatest so that the stalks will be caused to snap upward and fall upon the blades. If the stalks should assume positions beneath the blades the effective operation of the machine would be interfered with. The blades can be adjusted laterally to operate upon rows different distances apart by putting thicker or thinner spacing blocks 18 therebetween. The operator can easily adjust the blades vertically by means of lever 8 so as to permit them to strike the stalks at the proper points and to prevent them from coming into contact with large stones, stumps, etc., which may be in the path thereof.

As shown in Fig. 4 the blades 22 may be pivotally mounted upon ears 23 which extend from the supporting means. A series of apertures 24 is formed in each of the ears for the reception of a bolt whereby the blades can be locked at any desired angle and adjustably connected links 25 are pivotally connected to the blades to constitute braces. By providing a connection such as described the blades can be independently adjusted to any desired angle.

What is claimed is:

1. The combination with portable stalk bending means; of guide hangers depending therefrom, a bar pivotally supported by said means and movable between the hangers, means for adjusting the bar between the hangers, and an obliquely disposed cutting blade extending from and movable with the bar.

2. The combination with portable stalk bending means; of guide hangers depending therefrom, a bar pivotally supported by said means and adjustable between the hangers, and cutting blades adjustably connected to the bar and movable therewith.

In testimony that I claim the foregoing as my own, I have hereto affixed my signature in the presence of two witnesses.

GEORGE EDWARD HARPER.

Witnesses:
 WILLIAM BRYANT,
 JOHN HOWELL.